(12) United States Patent
Karlsson et al.

(10) Patent No.: US 8,327,188 B2
(45) Date of Patent: Dec. 4, 2012

(54) HARDWARE TRANSACTIONAL MEMORY ACCELERATION THROUGH MULTIPLE FAILURE RECOVERY

(75) Inventors: Martin R. Karlsson, San Francisco, CA (US); Sherman H. Yip, San Francisco, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 210 days.

(21) Appl. No.: 12/618,282

(22) Filed: Nov. 13, 2009

(65) Prior Publication Data

US 2011/0119528 A1  May 19, 2011

(51) Int. Cl.
*G06F 11/00* (2006.01)
(52) U.S. Cl. ............................................ 714/15; 714/25
(58) Field of Classification Search .................. 714/10, 714/15
See application file for complete search history.

(56) References Cited

U.S. PATENT DOCUMENTS

| | | | | |
|---|---|---|---|---|
| 7,451,300 B1* | 11/2008 | Anvin et al. | ................... | 712/244 |
| 2006/0101254 A1* | 5/2006 | Tremblay et al. | ............. | 712/228 |
| 2008/0126883 A1* | 5/2008 | Caprioli et al. | ................. | 714/49 |
| 2008/0288819 A1* | 11/2008 | Heller, Jr. | ...................... | 714/19 |
| 2010/0229043 A1* | 9/2010 | Saha et al. | ...................... | 714/35 |
| 2010/0332901 A1* | 12/2010 | Nussbaum et al. | ............. | 714/16 |

OTHER PUBLICATIONS

"Speculation-based conflict resolution in hardware transactional memory," Parallel & Distributed Processing, 2009. IPDPS 2009. IEEE International Symposium, May 23-29, 2009, Titos et al.*

* cited by examiner

*Primary Examiner* — Scott Baderman
*Assistant Examiner* — Neil Miles
(74) *Attorney, Agent, or Firm* — Park, Vaughan, Fleming & Dowler LLP; Anthony P. Jones

(57) ABSTRACT

The described embodiments provide a processor (e.g., processor 102) for executing instructions. During execution, the processor starts by transactionally executing instructions from a protected section of program code. The processor then encounters a transactional failure condition while transactionally executing the instructions from the protected section of program code. In response to encountering the transactional failure condition, the processor enters a transactional-scout mode and speculatively executes subsequent instructions in the transactional-scout mode.

11 Claims, 4 Drawing Sheets

HARDWARE TRANSACTIONAL MEMORY ACCELERATION THROUGH MULTIPLE FAILURE RECOVERY

BACKGROUND

1. Field

The described embodiments relate to computer systems. More specifically, the described embodiments relate to techniques for facilitating hardware transactional memory acceleration through multiple failure recovery.

2. Related Art

Modern processors that support hardware transactional memory include specialized hardware mechanisms that enable the processors to execute specified sections of program code ("protected sections") in transactions to ensure that the protected sections are executed atomically.

When a transactional memory processor, encounters a protected section, the processor generates a checkpoint to save the pre-transactional state of the processor. The processor then begins to execute the instructions from the protected section in a transaction. While executing the transaction, the processor buffers the transactional results and uses the results for subsequent dependent transactional operations, but does not update the architectural state of the processor with the transactional results. During the transaction, the processor also monitors the execution of the instructions in the protected section and terminates the transaction if a failure condition occurs. The processor can terminate the transaction due to a number of failure conditions, such as interfering memory accesses by other threads or processors, data translation lookaside buffer (dTLB) or cache misses, or buffer overflows.

If a transaction is successful, the processor joins the transactional results with the architectural state of the processor and continues executing subsequent instructions. However, if a failure condition is encountered and the transaction is terminated, the processor performs a pipe-clear operation (to clear transactional instructions from a pipeline in the processor), discards the buffered transactional results, and resumes execution from a failure program counter (fail PC). The program code at the fail PC typically causes the processor to inspect a register that indicates why the transaction failed to enable the processor to determine how to proceed after the transaction is terminated. For example, the processor may try to perform some remedial action (e.g., send a prefetch for a cache line) before retrying the transaction. The processor then restores the checkpoint and re-executes the transaction.

Unfortunately, the processor's computational resources can be used inefficiently when the processor encounters multiple failure conditions that force the processor to re-execute the transaction multiple times.

SUMMARY

The described embodiments provide a processor that transactionally executes instructions. During operation, the processor starts by transactionally executing instructions from a protected section of program code. Next, the processor encounters a transactional failure condition while transactionally executing the instructions from the protected section of program code. In response to the transactional failure condition, the processor enters a transactional-scout mode and speculatively executes subsequent instructions in the transactional-scout mode.

In some embodiments, the processor executes in the transactional-scout mode until encountering an indicator for the end of the protected section of program code. Upon encountering the indicator, the processor returns to a normal-execution mode to execute instructions from a failure program counter (fail PC).

In some embodiments, the processor executes subsequent instructions in the transactional-scout mode until the transactional failure condition is resolved and/or the transactional failure condition plus one or more additional transactional failure conditions are resolved. When the transactional failure condition is resolved, the processor returns to a normal-execution mode to execute instructions from a fail PC.

In some embodiments, if the processor determines that the transactional failure condition has been resolved before encountering an indicator for the end of the protected section of program code, the processor leaves the transactional-scout mode and returns to the normal-execution mode to execute instructions from the fail PC.

In some embodiments, a COMMIT instruction indicates the end of the protected section of program code. In these embodiments, while executing instructions in the protected section in the transactional-scout mode, the processor can execute the instructions in the protected section including the COMMIT instruction, but can prevent any transactional results from being committed to the architectural state of the processor. The processor can then continue to execute instructions following the protected section in the transactional-scout mode until at least the transactional failure condition is resolved.

In some embodiments, when entering the transactional-scout mode from the transactional-execution mode, the processor sets a transactional-failure indicator. In these embodiments, when executing the COMMIT instruction while executing instructions in a transactional-execution mode or the transactional-scout mode, the processor checks the state of the transactional-failure indicator. If the transactional-failure indicator is set, the processor executes the COMMIT instruction without committing any transactional results to the architectural state of the processor.

In some embodiments, when executing program code in the transactional-scout mode, the processor executes instructions to generate prefetches for cache lines and to update processor state, but does not commit transactional-scout mode results to the architectural state of the processor.

BRIEF DESCRIPTION OF THE FIGURES

In the figures, like reference numerals refer to the same figure elements.

DETAILED DESCRIPTION

Figure 1A:
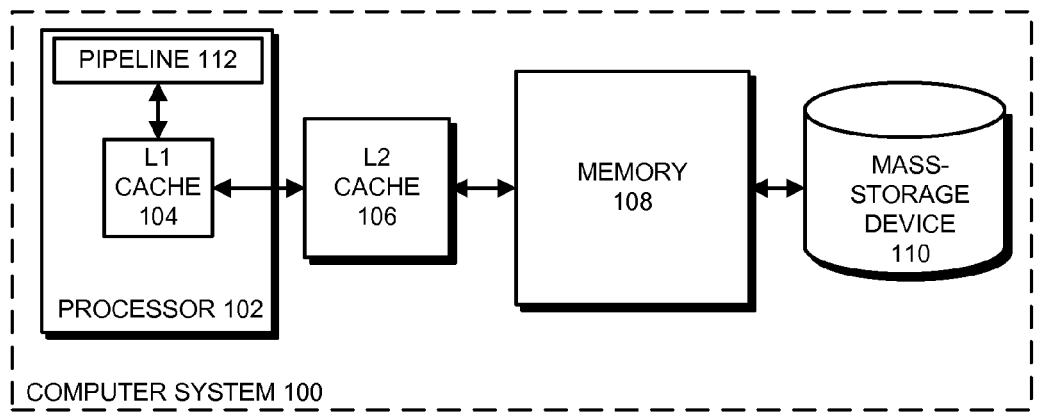
FIG. 1A presents a block diagram of a computer system accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that can be configured using program code (e.g., firmware, application code, an operating system, etc.) to perform one or more of the operations in the methods or processes.

Overview

The described embodiments facilitate a new "transactional-scout mode," in which a processor continues speculatively executing program code from a protected section after a transactional failure condition. In the described embodiments, processor 102 (see FIG. 1) can execute protected sections of program code transactionally. While executing a transaction, upon encountering transactional failure conditions that would normally cause a transactionally executing processor to terminate the transaction, clear the pipeline, and return to a failure program counter (fail PC), processor 102 instead uses hardware scout mode mechanisms in combination with transactional-scout mode mechanisms to execute subsequent instructions in the transactional-scout mode. In other words, in these embodiments, upon encountering a specified failure condition during transactional execution, processor 102 can immediately switch from transactional execution to transactional-scout mode and continue speculatively executing subsequent instructions.

Depending on the embodiment, processor 102 can execute in the transactional-scout mode until either: (1) the end of the protected section is encountered; (2) the failure condition is resolved (which can occur before, at, or after the end of the protected section); or (3) the failure condition and one or more additional transactional failure conditions encountered during transactional-scout mode are resolved (which can occur before, at, or after the end of the protected section). Upon reaching the end of the protected section or upon the resolution of the failure condition, processor 102 clears pipeline 112, branches to a fail PC, and resumes operation in a normal-execution mode. (The program code at the fail PC may then cause processor 102 to re-execute the transaction for the protected section.) In alternative embodiments, upon finishing execution in the transactional-scout mode, processor 102 can restore state information from a checkpoint which was set before starting to execute the transaction, and can resume operating in the normal-execution mode.

In these embodiments, in addition to continuing to perform useful work while the failure condition is resolved, by executing in the transactional-scout mode, the described embodiments can potentially resolve additional transactional failure conditions which can enable processor 102 to proceed more efficiently when the protected section of code is subsequently re-executed in a transaction. Thus, by executing in the transactional-scout mode from the failure condition instead of immediately performing a pipe-clear operation and returning to a fail PC as done in existing processors, the described embodiments can avoid a situation that can occur in existing processors where the existing processor fails the transaction separately for each failure condition and potentially re-executes the transaction numerous times.

Computer System

FIG. 1A presents a block diagram of a computer system 100 in accordance with the described embodiments. Computer system 100 includes processor 102, L2 cache 106, memory 108, and mass-storage device 110. Processor 102 includes L1 cache 104 and pipeline 112. In the described embodiments, some or all of the elements shown in computer system 100 include mechanisms that provide support for the normal-execution mode, transactional-execution mode, scout mode, and transactional-scout mode operating modes. (The operating modes are described in more detail below.)

Processor 102 can include any device that is configured to perform computational operations. For example, processor 102 can be a central processing unit (CPU) such as a microprocessor, a controller, or an application-specific integrated circuit.

Mass-storage device 110, memory 108, L2 cache 106, and L1 cache 104 are computer-readable storage media that collectively form a memory hierarchy that stores data and instructions for processor 102. Generally, mass-storage device 110 is a high-capacity non-volatile memory, such as a disk drive or a large flash memory, with a large access time, while L1 cache 104, L2 cache 106, and memory 108 are smaller, faster semiconductor memories that store copies of frequently used data. For example, memory 108 can be a dynamic random access memory (DRAM) structure that is larger than L1 cache 104 and L2 cache 106, whereas L1 cache 104 and L2 cache 106 can include smaller static random access memories (SRAM). In some embodiments, L2 cache 106, memory 108, and mass-storage device 110 are shared between one or more processors in computer system 100. Such memory structures are well-known in the art and are therefore not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, a toy, audio/video electronics, a video game system, a control system (e.g., an automotive control system), or another electronic device.

Although we use specific components to describe computer system 100, in alternative embodiments, different components can be present in computer system 100. For example, computer system 100 can include video cards, network cards, optical drives, network controllers, I/O devices, and/or other peripheral devices that are coupled to processor 102 using a bus, a network, or another suitable communication channel. Alternatively, computer system 100 may include more of the elements shown in FIG. 1A. For example, computer system 100 may include additional processors 102, and the processors 102 may share some or all of L2 cache 106, memory 108, and mass-storage device 110 and/or may include some or all of their own memory hierarchy.

Figure 1B:
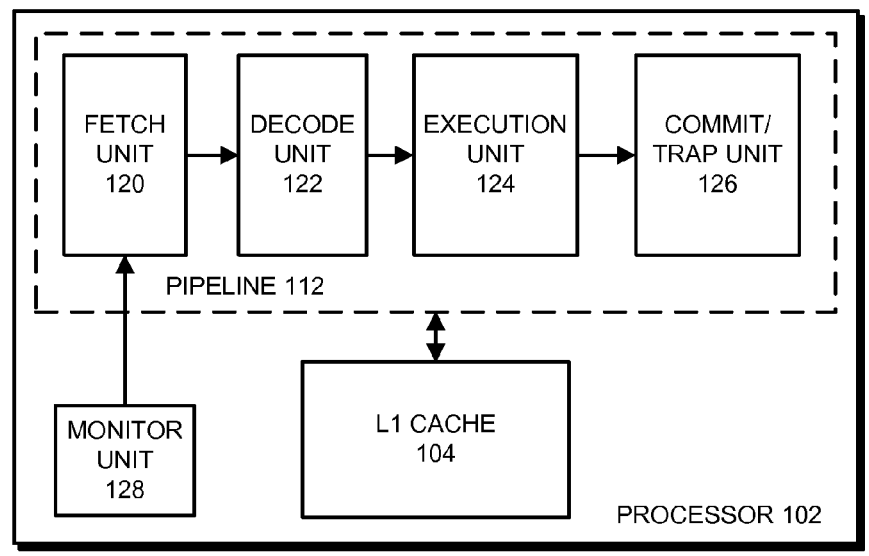
FIG. 1B presents a block diagram of a processor in accordance with the described embodiments.

FIG. 1B presents a block diagram of processor 102 in accordance with the described embodiments. Processor 102 includes pipeline 112, monitor unit 128, and L1 cache 104. As shown in FIG. 1B, pipeline 112 includes fetch unit 120, decode unit 122, execution unit 124, and commit/trap unit 126.

Generally, pipeline 112 executes code containing instructions. Within pipeline 112, fetch unit 120 fetches instructions from L1 cache 104 (or from other levels of the memory hierarchy) for execution. Next, decode unit 122 decodes the fetched instructions and prepares the instructions for execution in execution unit 124. Then, Execution unit 124 executes instructions forwarded from decode unit 122. Note that execution unit 124 can include one or more floating point execution units, integer execution units, branch execution units, and/or memory execution units (e.g., load-store units). Finally, commit/trap unit 126 retires successfully executed instructions (i.e., committing the results to the architectural state of processor 102/computer system 100) and handles traps/errors that arise during the execution of instructions.

Note that pipeline 112 is a simplified version of a pipeline for the purposes of illustration. In alternative embodiments, pipeline 112 can contain other stages (units), functional blocks, mechanisms, and/or circuits. The units, functional blocks, mechanisms, and/or circuits that can be used in a pipeline are known in the art and hence are not described in more detail.

In some embodiments, monitor unit 128 monitors conditions on processor 102 and signals one or more of the other units when a transactional failure condition has been resolved. For example, when data is returned for a load miss in L1 cache 104, monitor unit 128 can detect the data return and signal the other units in processor 102 that the data has returned. In addition, when a previously unavailable hardware resource (e.g., a full load or store buffer, dTLB, etc.) becomes available, monitor unit 128 can detect the availability of the hardware resource and signal the other units on processor 102 that the failure condition has been resolved. In the described embodiments, monitor unit 128 is one of the mechanisms that enables operating in the transactional-scout mode (interchangeably referred to as "transactional-scout mode mechanisms").

Note that although we show monitor unit 128 as a separate block in processor 102, in the described embodiments, some or all of monitor unit 128 can be located in one or more of the other sub-blocks of processor 102. For example, in some embodiments, a portion of monitor unit 128 can be contained in fetch unit 120 and configured to monitor a data cache miss buffer (not shown) in fetch unit 120 for data returns. In these embodiments, when data returns, the portion of monitor unit 128 can signal fetch unit 120 that the data has returned, which causes fetch unit 120 to stop operating in a transactional-scout mode and resume executing in a normal-execution mode (possibly from a fail PC, as described below).

In some embodiments, fetch unit 120 includes an operating mode mechanism (not shown) for controlling the operating mode of processor 102. This operating mode mechanism controls whether processor 102 operates in normal-execution mode, transactional-execution mode, scout mode, or transactional-scout mode.

In some embodiments, the operating mode mechanism includes an indicator of the current operating mode of processor 102. In these embodiments, the operating mode mechanism switches the indicator of the current operating mode when changing the operating mode (e.g., from normal-execution mode to transactional execution). Other related sub-systems in processor 102 can then detect the changed operating mode and adjust their operations accordingly.

For example, upon detecting that the operating mode mechanism has switched from normal-execution mode to transactional-execution mode, commit/trap unit 126 (or the portion of monitor unit 128) can begin monitoring to detect the end of the transaction (e.g., as indicated by a COMMIT instruction, etc.) or for a transactional failure condition. In addition, upon detecting that the operating mode mechanism has switched from normal-execution mode to transactional-execution mode, one or more of the other units can begin monitoring for transactional failure conditions such as unresolvable branches, dTLB misses, or an overflow of a hardware structure such as a load or store buffer.

In some embodiments, processor 102 includes a checkpoint generation mechanism (not shown). This checkpoint generation mechanism includes one or more register files, memories, tables, lists, or other structures that facilitate saving a copy of the architectural state of processor 102. In these embodiments, when commencing execution of a protected section of program code in a transaction, the checkpoint generation mechanism can perform operations to checkpoint the pre-transactional architectural state of processor 102. In some embodiments, the checkpoint generation mechanism is distributed among one or more of the sub-blocks of processor 102 shown in FIG. 1B.

In addition to the sub-systems shown in FIG. 1B, computer system 100 includes functional blocks, circuits, and hardware for enabling hardware transactional execution (not shown). Hence, processor 102 includes hardware structures that enable transactional execution without requiring specialized controls in application code, the operating system, or other software. For example, cache lines in the memory hierarchy can include metadata that facilitates marking cache lines that have been accessed (i.e., read from or written to) during a transaction. As another example, processor 102 can include shadow copies of register files, load/store buffers, and other processor structures that can be used to buffer the transactional results and/or to prevent transactional operations from affecting the architectural state of processor 102.

Exemplary embodiments of a system that supports hardware transactional execution are described in U. S. Pat. No. 6,862,664, entitled "Method and Apparatus for Avoiding Locks by Speculatively Executing Critical Sections," by inventors Shailender Chaudhry, Marc Tremblay, and Quinn A. Jacobson, which is hereby incorporated by reference to describe hardware transactional execution.

Computer system 100 also includes functional blocks, circuits, and hardware for operating in a scout mode. Exemplary embodiments of a system that supports scout mode are described in U.S. Pat. Pub. No. 2004/0133769, entitled "Generating Prefetches by Speculatively Executing Code Through Hardware Scout Threading," by inventors Shailender Chaudhry and Marc Tremblay, which is hereby incorporated by reference.

In some embodiments, processor 102 can use some or all of the hardware mechanisms used to facilitate "normal" scout mode while performing operations in transactional-scout mode. For example, processor 102 can use some or all of the normal scout mode mechanisms during transactional-scout mode to generate prefetches, update processor state (i.e., update dTLB, branch predictor, etc.), and perform other operations.

Scout Mode

In the described embodiments, processor 102 supports "scout mode." Generally, scout mode is a form of speculative execution during which processor 102 executes program code to prefetch cache lines and update other processor state, but does not commit results to the architectural state of processor 102.

More specifically, upon encountering a specified stall condition while executing program code, processor 102 generates a checkpoint to preserve the architectural state of processor 102 and then enters scout mode. While operating in scout mode, processor 102 speculatively executes the code from the point of the stall without committing results of the speculative execution to the architectural state of processor 102. If processor 102 encounters a memory reference while operating in scout mode, processor 102 determines if a target address for the memory reference can be resolved. If so, processor 102 issues a prefetch for the memory reference to load a cache line for the memory reference into a cache (e.g., L1 cache 104).

In addition to issuing prefetches for cache lines, processor 102 can update other memories or processor structures for which an update can be resolved. For example, processor 102 can update translation lookaside buffer (TLB) page table entries, branch predictions in a branch prediction unit, and/or other memories or tables.

When the stall condition is eventually resolved, processor 102 clears pipeline 112, restores the checkpoint, and resumes execution in a normal-execution mode. (Note that restoring the checkpoint and resuming execution in the normal-execution mode can involve re-executing some or all of the instructions executed during scout mode.)

In these embodiments, executing in scout mode past the stall condition enables processor 102 to "warm up" caches, memories, tables, and other processor structures using speculatively executed instructions. The warmed-up structures can subsequently be used to enable more efficient execution upon resuming execution in the normal-execution mode.

In addition, in the described embodiments, executing in scout mode can help processor 102 resolve failure conditions during a "transactional-scout mode," during which processor 102 uses scout mode mechanisms in combination with transactional-scout mode mechanisms to speculatively execute program code following a transactional failure condition. (Transactional-scout mode is described in detail below.)

Transactional-Execution Mode

In the described embodiments, processor 102 supports "transactional-execution mode." During transactional-execution mode, processor 102 executes a section of program code (a "protected section") using transactional memory structures in processor 102 ensure that the protected section completes without encountering a specified failure condition.

In some embodiments, the protected section of program code includes a set of instructions that are transactionally executed to ensure that instructions execute without encountering one of the specified failure conditions. In these embodiments, the start of the protected section can be indicated by a special instruction or by a particular pattern of instructions in the program code. For example, some embodiments include a start transactional execution (STE) instruction for indicating the start of a transaction. As another example, specific instructions (e.g., LOAD instructions), sequences of instructions, method calls, or other portions of the program code can indicate of the start of a transaction. Similarly, the end of the protected section can be indicated by a special instruction or a specified pattern in the program code. For example, some embodiments include a COMMIT instruction for indicating the end of a transaction.

Before transactionally executing the protected section, processor 102 generates a checkpoint to preserve a pre-transactional state of processor 102. This involves saving processor 102's precise pre-transactional architectural state to enable processor 102 to recover/restore the architectural state just prior to the start of the transaction. When saving the architectural state, processor 102 saves any information which is useful for restarting instruction execution at the point in the program code just prior to the protected section. For example, processor 102 can save register values, program counter(s), program stack, and/or other information useful for restarting execution from the checkpoint. Mechanisms for generating a checkpoint to preserve the architectural state of the processor are known in the art and are not described in further detail.

In some embodiments, before executing the transaction for the protected section, processor 102 also stores a fail PC value. In these embodiments, the fail PC indicates a location in program code that can be branched-to by processor 102 upon encountering a transactional failure condition. The location in program code can include code for error handling, transactional clean-up, checkpoint restoration, and/or resuming execution in normal-execution mode.

In these embodiments, the fail PC can be acquired from the instruction (e.g., the STE instruction) at the start of transactional execution. Alternatively, processor 102 can automatically set the fail PC to a corresponding value at the start of each transaction. In some embodiments, the fail PC can be the same value as a program counter saved during the checkpoint operation (i.e., the fail PC can indicate the location in the program code immediately prior to the protected section).

While subsequently executing the protected section in the transaction, processor 102 buffers transactional results to enable the transactional results to be discarded in the event that a failure condition is encountered during the transaction. In some embodiments, buffering the transactional results involves buffering store operations from the protected section (i.e., transactional store operations), as well as preventing any other transactional operations and/or results from improperly updating the state of processor 102 or computer system 100 (e.g., buffering transactional branch prediction updates, etc.).

Until the transaction is complete, processor 102 monitors transactionally-accessed memory locations and processor structures to determine if one of the specified failure conditions has occurred. If the transaction completes and a failure condition has not occurred, processor 102 atomically commits the buffered transactional results to the architectural state of computer system 100 and continues executing subsequent instructions.

Otherwise, if a failure condition occurs, processor 102 determines the nature of the failure condition. If the failure condition is such that processor 102 will not benefit from speculative execution in transactional-scout mode, processor 102 immediately deletes the buffered transactional results, clears pipeline 112, and branches to a failure program counter (fail PC). (In some embodiments, instead of branching to the fail PC, processor 102 restores the checkpoint and simply resumes operation in the normal-execution mode.)

Otherwise, if the failure condition is such that processor 102 will benefit from speculative execution in transactional-scout mode, processor 102 immediately switches from transactional execution to the transactional-scout mode. Processor 102 then executes instructions in the transactional-scout mode until encountering the end of the transactional-scout mode episode. In these embodiments, the end of the transactional-scout mode episode can occur either: (1) upon encountering the end of the transaction (which occurs at the end of the protected section in the program code); or (2) upon encountering the resolution of the transactional failure condition (which may occur before, as, or after all the instructions in the protected section have been executed).

Upon encountering the end of transactional-scout mode episode, processor 102 deletes the buffered transactional results, clears the pipeline, and branches to the fail PC to execute subsequent instructions. (In some embodiments, instead of branching to the fail PC, processor 102 restores the checkpoint and simply resumes operation in the normal-execution mode.)

In these embodiments, the transactional failure conditions can include any operating condition that compromises the appearance of atomicity of the transaction. More specifically, transactions must appear as if they happen atomically, both from the perspective of a processor 102 on which the transaction is executed (i.e., the thread on processor 102 that executes the transaction) and from the perspective of other threads on processor 102 or other processors within computer system 100. Thus, transactional results should ideally be released to computer system 100 in a manner that makes the results appear to other threads or processors as if all the results were released at the same instant. Hence, any operation that partially exposes transactional results or makes results appear to have been released at different times is considered a failure condition. Moreover, any operation by another thread/processor that interferes with the appearance of atomicity, such as a read from a memory location stored to by a transactional instruction (i.e., an instruction within the protected section that is executed during the transaction), or a write of a memory location loaded from or stored to by a transactional instruction, is also considered a failure condition.

In addition, the transactional failure conditions can include any operating condition that compromises the ability of processor 102 to successfully complete the transaction. For example, failure conditions can include, but are not limited to, a fail instruction, an instruction that is not allowed to be executed in a protected section, a trap/interrupt, a dTLB miss in the protected section, an overflow of a hardware structure such as a load or store buffer, running out of hardware resources to track transactional operations such as loads and stores, encountering a predetermined number of stalling operations, or a branch that could not be resolved during the transaction (e.g., due to dependency of a previously outstanding load miss and a store whose address is dependent on an outstanding load).

As described above, a subset of the failure conditions cause processor 102 to immediately terminate the transaction and return to the fail PC without switching to the transactional-scout mode. Generally, this subset of the failure conditions includes any condition which is likely to be impossible or too complex to resolve and/or for which the benefit of operating in the transactional-scout mode is likely to be negligible in comparison with the burden of resolving the failure condition. For example, "wrong path" failure conditions, for which continued execution would involve proceeding along an incorrect path, are included in the subset of failure conditions. In addition, when a transactionally-accessed memory location is overwritten by another thread or processor during the transaction, the failure is unrecoverable because the overwritten data cannot be recovered. Moreover, the subset of failure conditions includes failure conditions that would require significant new hardware in processor 102 to enable resolving the failure condition.

Figure 2:
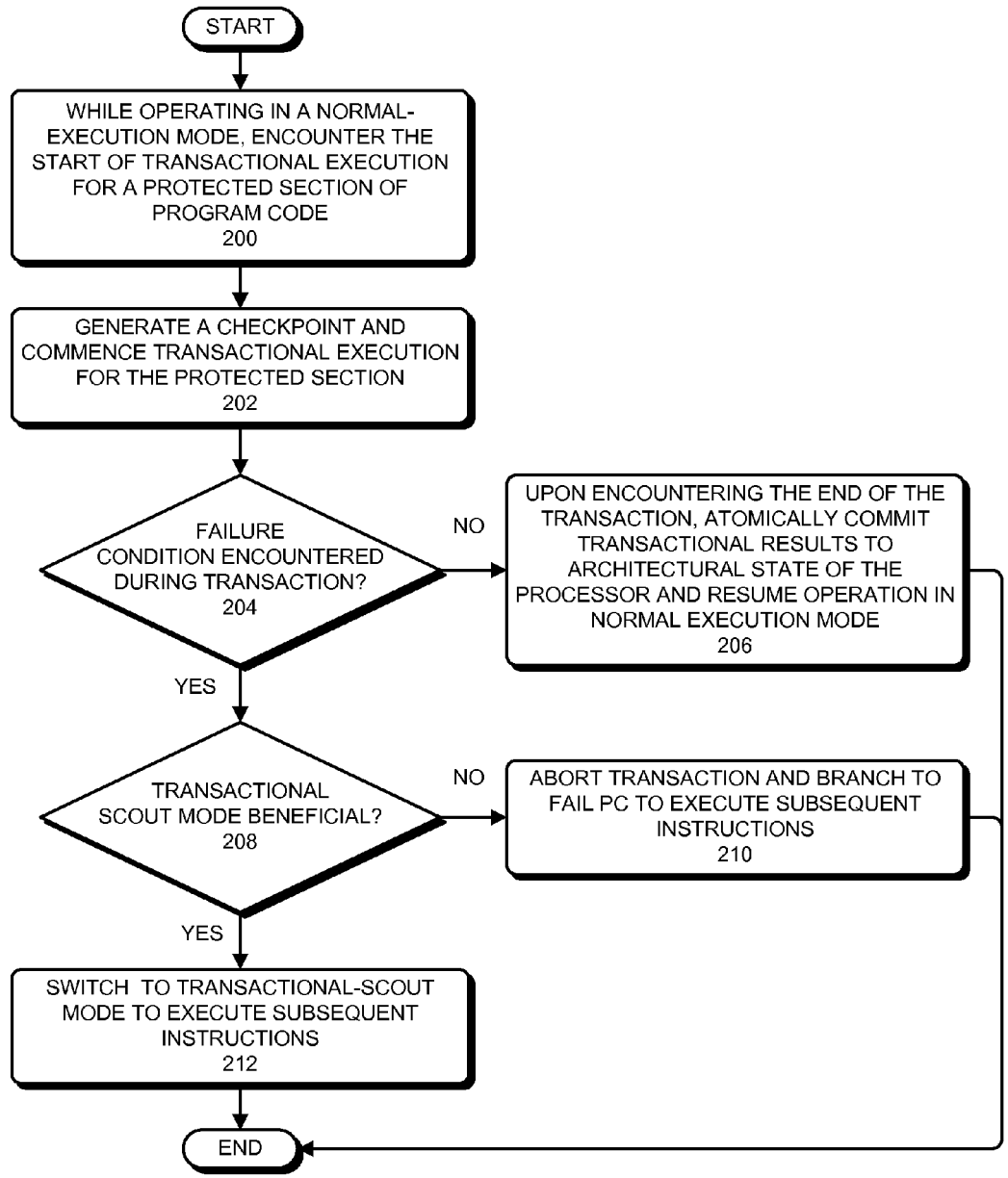
FIG. 2 presents a flowchart illustrating an exemplary process for transactionally executing program code in accordance with the described embodiments.

FIG. 2 presents a flowchart illustrating an exemplary process for transactionally executing program code in accordance with the described embodiments. The sequence of operations starts with processor 102 non-transactionally executing program code in a normal-execution mode. Processor 102 then encounters the start of transactional execution for a protected section of program code (i.e., the start of a transaction) (step 200).

Next, processor 102 generates a checkpoint and commences transactional execution for the protected section (step 202). Processor 102 can also save a failure program counter (fail PC) that is used to recover from transactional failures. The fail PC can be acquired from an instruction that starts the protected section (e.g., an STE instruction) or can be a default value. In some embodiments, the fail PC is equal to the program counter at the beginning of the protected section (which is saved in the checkpoint).

While executing the transaction, processor 102 executes instructions in the protected section using some or all of the same units and structures in computer system 100 that are used during non-transactional execution. However, upon encountering a load from a cache line, processor 102 loads data from the cache line and places a load-mark on the cache line in L1 cache 104. In addition, upon encountering a store to a cache line, processor 102 buffers the store in a transactional store buffer (STB) (thereby deferring the store) and places a store-mark on the cache line in L1 cache 104.

Buffering stores during the transaction in this way prevents the buffered stores from being committed and incorrectly affecting the architectural state of computer system 100 before the transaction is completed, thereby enabling processor 102 to recover to the checkpoint should the transaction fail. In addition, the load-marks and store-marks placed on accessed cache lines enable computer system 100 to monitor accesses by other threads or processors to the marked cache lines.

During the transaction, other threads or processors are permitted only limited access to marked cache lines. For example, another thread or processor can load from a load-marked cache line. However, in some embodiments, if another thread or processor attempts to perform an interfering access to a cache line that could result in a return of transactionally written data and/or the overwriting of transactionally read or written data in a cache line, a failure condition occurs. In some embodiments, an interfering access that involves another thread or processor writing to a transactionally-accessed memory location a failure condition that causes processor 102 to immediately terminate the transaction and return to the fail PC without switching to the transactional-scout mode.

While executing the transaction, processor 102 monitors computer system 100 (i.e., transactionally-accessed memory locations, processor structures, etc.) to determine if a failure condition has occurred (step 204). If the transaction completes and a failure condition has not occurred, processor 102 atomically commits the buffered transactional results to the architectural state of computer system 100 and continues executing subsequent instructions (step 206).

By atomically committing the transactional results to the architectural state of computer system 100, processor 102 makes the results visible to other threads or processors in computer system 100 in such a way that the results appear to the other threads or processors to have been released in the same instant of time. For example, in some embodiments, atomically committing the transactionally buffered stores involves locking store-marked cache lines, writing each buffered store back to the corresponding locked cache lines, and removing the lock from the corresponding locked cache line. In these embodiments, while the cache lines are locked, no other thread or processor is permitted to access the cache lines. However, when the locks are removed, the cache lines can be accessed by any thread or processor (using a controlling cache coherency protocol). Hence, with respect to other threads or processors in the system, all of the buffered stores (i.e., the results of the transaction) appear to be released to computer system 100 in the same instant.

However, if a failure condition is encountered, processor 102 determines if transactional-scout mode would be beneficial (step 208). In these embodiments, processor 102 can determine if the failure condition is one of the failure conditions for which continuing in transactional-scout mode would not benefit subsequent re-execution of the transaction in transactional-scout mode (or execution in normal-execution mode). If switching to transactional-scout mode would not be beneficial, processor 102 aborts the transaction and branches to the fail PC to execute subsequent instructions (step 210). Alternatively, processor 102 can restore the checkpoint and resume execution in normal-execution mode.

In some embodiments, the program code pointed to by the fail PC causes processor 102 to clean up the transactional execution, including handling errors, restoring transactionally-accessed processor structures and/or memories to a pre-transactional state, etc. In some of these embodiments, the program code pointed to by the fail PC causes processor 102 to restore the checkpoint and resume execution from the restored checkpoint, which can involve re-executing the transaction.

In some embodiments, there is a limit on the number of times that a transaction can be re-executed from the checkpoint (e.g., 3 times). After reaching the limit, processor 102 enters a locking mode, wherein processor 102 locks cache lines (or cache structures) while executing the protected section non-transactionally, to ensure that execution of the protected section completes.

In contrast, if transactional-scout mode would be beneficial, processor 102 switches to transactional-scout mode and starts speculatively executing the subsequent instructions (step 212). Processor 102 continues executing instructions in the transactional-scout mode until encountering the end of the transactional-scout mode episode, as is described below. Upon encountering the end of the transactional-scout mode episode, processor 102 clears the pipeline (i.e., performs a pipe-clearing operation) and branches to the fail PC to execute subsequent instructions.

Transactional-Scout Mode

As described above, processor 102 supports the transactional-scout mode. Generally, transactional-scout mode is a form of speculative execution performed by processor 102 after encountering a failure condition while transactionally executing a protected section of the program code. During transactional-scout mode, processor 102 executes program code to resolve transactional failure conditions and update other processor state (e.g., prefetch cache lines, generate branch predictions, update translation lookaside buffers, etc.), but does not commit the speculative results to the architectural state of processor 102.

Note that as described above, transactional failure conditions can include any operating condition that compromises the ability of processor 102 to successfully complete the transaction, or compromises the appearance of atomicity of the transaction. Thus, the resolution of the transactional failure condition includes any operation(s) that resolve the failure condition. For example, the resolution of the transactional failure condition can include the return of a page entry for a TLB, the freeing of one or more entries in a store buffer, etc.

In the transactional-scout mode, processor 102 uses scout mode mechanisms and transactional-scout mode mechanisms to speculatively execute instructions after encountering the transactional failure condition until the end of the transactional-scout mode episode. In the described embodiments, the end of the transactional-scout mode episode can occur either: (1) when the transactional failure condition is resolved, or (2) when the end of the protected section is encountered.

In some embodiments, the resolution of the transactional failure condition can include the resolution of only a single transactional failure condition. For example, in some embodiments, the transactional failure condition that caused processor 102 to switch to transactional-scout mode (i.e., the original transactional failure condition) is the only failure condition that is resolved.

In some embodiments, the resolution of the transactional failure condition can include the resolution of a combination of two or more failure conditions. In these embodiments, in addition to the original failure condition, other failure conditions can be encountered during transactional-scout mode that would have caused the transaction to fail, had they been encountered during transactional-execution mode. For example, in some embodiments, all outstanding TLB page entry requests have to be resolved before the transactional failure condition is considered to be resolved. In these embodiments, the TLB page entry requests can include an original page entry request along with one or more additional requests generated during transactional-scout mode.

In these embodiments, processor 102 ends the transactional-scout mode episode as soon as the transactional failure condition is resolved. The resolution of the transactional failure condition can occur anytime after the start of transactional-scout mode, from immediately after the start of transactional-scout mode and possibly before finishing executing the protected section transactional-scout mode, to at or after finishing executing the protected section in the transactional-scout mode. For example, the failure condition can be resolved after executing one or more instructions after the end of the protected section.

In these embodiments, the resolution of the failure condition can be signaled by monitor unit 128 when the failure condition has been resolved. For example, monitor unit 128 can determine that a cache line has returned to L1 cache 104 or that a dTLB page entry has been returned to a dTLB and signal fetch unit 120. The operating mode mechanism in fetch unit 120 can then end the transactional-scout mode episode. (Recall that some or all of monitor unit 128 can be located in one or more of the units or structures in processor 102 or computer system 100.)

In contrast, in the embodiments where the end of the transactional-scout mode occurs at the end of the protected section, processor 102 completes the transactional-scout mode episode when (i.e., as soon as) the end of the protected section is encountered. In these embodiments, the end of the protected section can be indicated by a particular instruction (e.g., a COMMIT instruction) or by a predetermined pattern of instructions in the program code.

In these embodiments, monitor unit 128 can determine that the end of the protected section has been encountered and can signal the operating mechanism in fetch unit 120 accordingly. The operating mechanism in fetch unit 120 can then end the transactional-scout mode episode.

In some embodiments, upon reaching the end of the transactional-scout mode episode, processor 102 branches to a fail PC to execute subsequent instructions in the normal-execution mode. As described above, the program code pointed to by the fail PC can include error-handling or transactional clean-up code. In these embodiments, the fail PC can be set by processor 102 when starting operation in transactional-execution mode. For example, processor 102 can acquire a fail PC from an STE instruction or can use a default fail PC. In alternative embodiments, upon reaching the end of the transactional-scout mode episode, processor 102 performs a pipe-clear operation, restores a checkpoint and resumes operation in normal-execution mode.

In the described embodiments, transactional-scout mode differs from prior scout mode and transactional-execution mode implementations in several ways. For example, in the some embodiments, when entering the transactional-scout mode, processor 102 never generates a checkpoint. This is because upon completing operation in transactional-scout mode, processor 102 does not restore a checkpoint, but instead returns to a fail PC set upon starting transactional execution or restores a checkpoint generated when starting transactional execution, and uses the restored program counter from the checkpoint to execute subsequent instructions.

In addition, in embodiments where operating in transactional-scout mode episode ends at the end of the protected section, commit/trap unit 126 monitors the instructions that have been executed by execution unit 124 to determine when the transaction has ended (i.e., when the COMMIT instruction or other indication of the end of the transaction occurs in the protected section). Upon determining that the transaction has ended, commit/trap unit 126 signals fetch unit 120 that the transactional-scout mode episode has ended. In these embodiments, commit/trap unit 126 can also cause processor 102 to perform a pipe-clear operation to remove transactional-execution mode and/or transactional-scout mode instructions from pipeline 112.

Moreover, processor 102 can include a "transactional fail" flag that indicates whether processor 102 has encountered a failure condition during a transaction and hence has entered transactional-scout mode. Upon encountering the end of a protected section (e.g., upon encountering the COMMIT instruction), commit/trap unit 126 signals fetch unit 120 that the end of the protected section instruction has been encountered. Fetch unit 120 then checks the state of the transactional fail flag to determine how to proceed. If the transactional fail flag is unset, the transaction has been executed successfully and the results of the transaction can be committed to the architectural state of the system as described above.

However, if the transactional fail flag is set and processor 102 is configured to end the transactional-scout mode episode at the end of the protected section (e.g., at the COMMIT instruction), processor 102 handles the failure as described above—pipe-clearing pipeline 112 and branching to a fail PC or restoring the checkpoint that was generated on starting transactional execution. However, if the transactional fail flag is set and processor 102 is configured to end the transactional-scout mode episode when the transactional failure condition is resolved, processor 102 can continue executing instructions in the transactional-scout mode without committing the transactional results to the architectural state of processor 102. Processor 102 can then end the transactional-scout mode when the transactional failure condition is eventually resolved.

In the described embodiments, while executing in transactional-scout mode, processor 102 may encounter two or more transactional failure conditions. However, unless the transactional failure conditions are the type of failure conditions that cause an immediate branch to the fail PC, processor 102 continues to execute in transactional-scout mode. In other words, processor 102 can execute load and store instructions to generate prefetches, can send dTLB lookup requests, can resolve branches, and can perform other operations to resolve any number of transactional failure conditions and pre-warm the processor state for a subsequent execution of the protected section in the transactional-execution mode (or in another operating mode, such as normal-execution mode).

Figure 3:
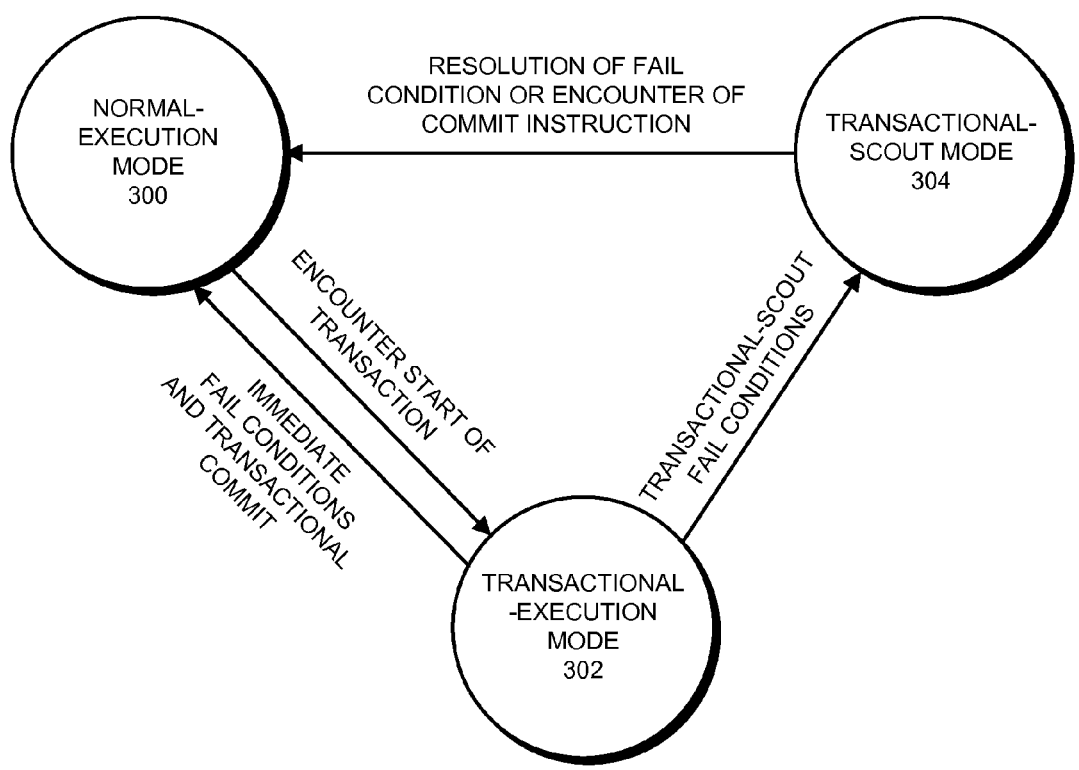
FIG. 3 presents a state diagram illustrating transitions in operating modes in a processor that supports a transactional-scout mode in accordance with the described embodiments.

FIG. 3 presents a state diagram illustrating transitions in operating modes in a processor that supports transactional-scout mode in accordance with the described embodiments. As can be seen in FIG. 3, the described embodiments include normal-execution mode 300, transactional-execution mode 302, and transactional-scout mode 304. As described above, during normal-execution mode 300, processor 102 executes instructions in program order normally (i.e., not using transactional memory structures and non-speculatively); during transactional-execution mode 302, processor 102 executes instructions in a protected section of program code in a transaction; and during transactional-scout mode 304, processor 102 speculatively executes instructions following a transactional failure condition in scout mode.

We assume that processor 102 starts in normal-execution mode 300. While executing instructions in the normal-execution mode 300, processor 102 encounters a protected section that is to be transactionally executed. For example, processor 102 can encounter an STE instruction, a pattern of instructions in the program code, or another indication of a protected section.

Processor 102 then follows the "encounter start of transaction" path and switches from normal-execution mode 300 to transactional-execution mode 302. In the described embodiments, the transition from normal-execution mode 300 to transactional-execution mode 302 can involve generating a checkpoint to preserve the pre-transactional architectural state of processor 102, recording a fail PC, switching processor 102's operational state to transactional-execution mode 302 (e.g., signaling the operating mode mechanism to update the operating state of processor 102, etc.), and executing subsequent instructions in transactional-execution mode 302.

While executing the transaction, processor 102 uses hardware transactional memory mechanisms to monitor for specified failure conditions. If the protected section is executed without encountering a failure condition, processor 102 follows the "transactional commit" path and switches from transactional-execution mode 302 to normal-execution mode 300. In the described embodiments, the transition from transactional-execution mode 302 to normal-execution mode 300 can involve committing the transactional results to the architectural state of the processor, deleting the checkpoint, deleting the fail PC, switching processor 102's operational state to normal-execution mode 300, and executing subsequent instructions in normal-execution mode 300.

However, if a transactional failure condition is encountered and processor 102 determines that executing in the transactional-scout mode would not be beneficial (e.g., an unresolvable branch, an overwrite of a transactionally-accessed cache line, etc.), processor 102 follows the "immediate fail condition" path and switches from transactional-execution mode 302 to normal-execution mode 300. In the described embodiments, the transition from transactional-execution mode 302 to normal-execution mode 300 can involve performing a pipe-clear operation, restoring the checkpoint, switching processor 102's operational state to normal-execution mode 300, and/or executing subsequent instructions in normal-execution mode 300. In some embodiments, executing subsequent instructions in normal-execution mode 300 involves executing instructions starting at the fail PC.

Otherwise, if a transactional failure condition is encountered and processor 102 determines that executing in the transactional-scout mode would be beneficial (e.g., an overflowed load buffer, a dTLB miss, a miss on a cache line in L1 cache 104, etc.), processor 102 follows the "transactional scout fail condition" path and switches from transactional-execution mode 302 to transactional-scout mode 304. In the described embodiments, the transition from transactional-execution mode 302 to transactional-scout mode 304 can involve switching processor 102's operational state to transactional-scout mode 304, engaging monitor unit 128 to monitor for the end of the transactional-scout episode, and executing subsequent instructions in transactional-scout mode 304.

As described above, processor 102 can be configured in two ways with regard to ending a transactional-scout mode episode. When configured in the first way, processor 102 ends the transactional-scout mode episode when monitor unit 128 determines that the transactional failure condition is resolved. When configured in the second way, processor 102 ends the transactional-scout when monitor unit 128 determines that the end of the protected section (i.e., where the transaction would have finished, had the failure condition not occurred) has been encountered. In either case, upon determining that the end of the transactional-scout mode episode has been reached, processor 102 follows the "resolution of fail condition or encounter of commit instruction" path and switches from transactional-scout mode 304 to normal-execution mode 300. In the described embodiments, the transition from transactional-scout mode 304 to normal-execution mode 300 can involve switching processor 102's operational state to normal-execution mode 300, and executing subsequent instructions in normal-execution mode 300 from the fail PC. Alternatively, processor 102 can restore the checkpoint and resume execution from the program counter that was saved when the checkpoint was generated.

Figure 4:
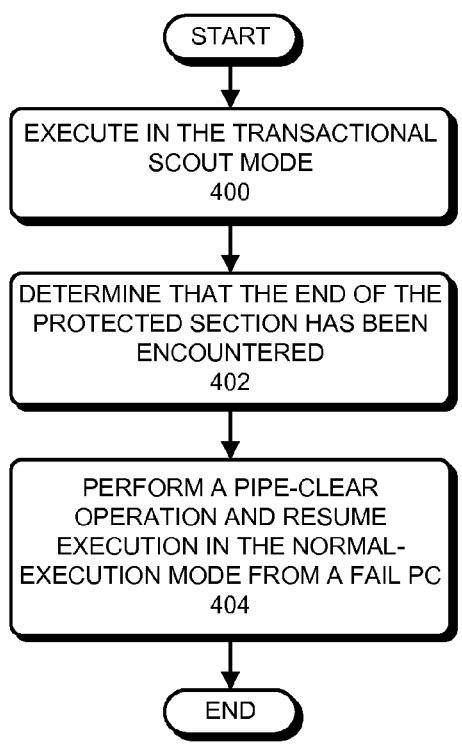
FIG. 4 presents a flowchart illustrating a process for executing in the transactional-scout mode in accordance with the described embodiments.

FIG. 4 presents a flowchart illustrating a process of executing in the transactional-scout mode in an embodiment where a transactional-scout mode episode ends when processor 102 encounters the end of a protected section. (In contrast to FIG. 5, which presents an embodiment where a speculative episode ends when the transactional failure condition is resolved.) As shown in FIG. 4, processor 102 starts by executing in the transactional-scout mode (step 400). In some embodiments, step 400 follows (occurs after) step 212 in FIG. 2.

Processor 102 then determines that the end of the protected section has been encountered (step 402). For example, processor 102 can encounter: a COMMIT instruction at the end of the protected section; another predetermined instruction; and/or a predetermined pattern in the program code.

Because processor 102 is configured to end execution in the transactional-scout mode upon encountering the end of the protected section, processor 102 performs a pipe-clear operation and resumes execution in the normal-execution mode from a fail PC (step 404). In alternative embodiments, instead of executing from the fail PC, processor 102 restores the checkpoint set on starting executing the transaction (see e.g., step 202 in FIG. 2) and resumes execution in the normal-execution mode.

Figure 5:
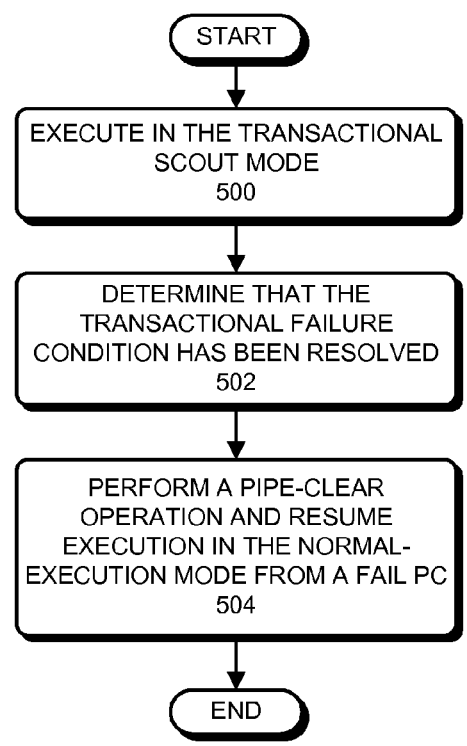
FIG. 5 presents a flowchart illustrating a process for executing in the transactional-scout mode in accordance with the described embodiments.

FIG. 5 presents a flowchart illustrating a process of executing in the transactional-scout mode in an embodiment where a transactional-scout mode episode ends when the transactional failure condition is resolved. As shown in FIG. 5, processor 102 starts by executing in the transactional-scout mode (step 500). In some embodiments, step 500 follows (occurs after) step 212 in FIG. 2.

Processor 102 then determines that the transactional failure condition has been resolved (step 502). For example, processor 102 can determine that a page table entry has been returned for the TLB, that a processor resource has been freed, or that another transactional failure condition has been resolved. Recall that in some embodiments, resolving the transactional failure condition can involve resolving the original transactional failure condition along with one or more addition transactional failure conditions encountered during transactional-scout mode.

Because processor 102 is configured to end execution in the transactional-scout mode when the transactional failure condition has been resolved, processor 102 performs a pipe-clear operation and resumes execution in the normal-execution mode from a fail PC (step 504). In alternative embodiments, instead of proceeding in execution from the fail PC, processor 102 restores the checkpoint set on starting executing the transaction (see e.g., step 202 in FIG. 2) and resumes execution in the normal-execution mode.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for executing instructions in a transactional-scout mode in a processor, comprising:
transactionally executing instructions in the processor from a protected section of program code;
entering the transactional-scout mode and speculatively executing subsequent instructions in the transactional-scout mode when the transactional execution of the protected section of program causes a transactional failure condition;
executing subsequent instructions in the transactional-scout mode until the transactional failure condition is resolved or until the transactional failure condition and one or more additional transactional failure conditions are resolved; and
responsive to the transactional failure condition being resolved, returning to a normal-execution mode to execute instructions from a fail PC,
wherein a COMMIT instruction indicates an end of the protected section of program code, and wherein executing subsequent instructions in the transactional-scout mode comprises:
executing the instructions in the protected section including the COMMIT instruction in the transactional-scout mode, but preventing any transactional results from being committed to an architectural state of the processor in response to executing the COMMIT instruction; and
continuing to execute instructions following the protected section in the transactional-scout mode until the transactional failure condition is resolved.

2. The method of claim 1, wherein the method further comprises:
before encountering the end of the protected section of program code and responsive to determining that the transactional failure condition has been resolved, leaving the transactional-scout mode and returning to the normal-execution mode to execute instructions from the fail PC.

3. The method of claim 1, wherein entering the transactional-scout mode comprises setting a transactional-failure indicator, wherein executing the COMMIT instruction while executing instructions in a transactional-execution mode or the transactional-scout mode involves:
checking a state of the transactional-failure indicator; and when the transactional-failure indicator is set, executing the COMMIT instruction without committing any transactional results to the architectural state of the processor.

4. The method of claim 1, wherein executing program code in the transactional-scout mode involves executing instructions to generate prefetches for cache lines and to update processor state, but not committing transactional-scout mode results to an architectural state of the processor.

5. An apparatus for executing instructions in a transactional-scout mode, comprising:
a processor, wherein the processor is configured to:
transactionally execute instructions from a protected section of program code;
responsive to encountering a transactional failure condition, enter the transactional-scout mode and speculatively execute subsequent instructions in the transactional-scout mode;
execute subsequent instructions in the transactional-scout mode until the transactional failure condition is resolved or until the transactional failure condition and one or more additional transactional failure conditions are resolved; and
responsive to the transactional failure condition being resolved, return to a normal-execution mode to execute instructions from a fail PC,
wherein a COMMIT instruction indicates an end of the protected section of program code, and wherein when executing subsequent instructions in the transactional-scout mode until the transactional failure condition is resolved, the processor is configured to:
execute the instructions in the protected section including the COMMIT instruction in the transactional-scout mode, but prevent any transactional results from being committed to an architectural state of the processor in response to executing the COMMIT instruction; and
continue to execute instructions following the protected section in the transactional-scout mode until the transactional failure condition is resolved.

6. The apparatus of claim 5, wherein before encountering an end of the protected section of program code and responsive to determining that the transactional failure condition has been resolved, the processor is configured to leave the transactional-scout mode and return to the normal-execution mode to execute instructions from the fail PC.

7. The apparatus of claim 5, wherein when entering the transactional-scout mode the processor is configured to set a transactional-failure indicator, wherein when executing a COMMIT instruction while executing instructions in a transactional-execution mode or the transactional-scout mode, the processor is further configured to:
check a state of the transactional-failure indicator; and
when the transactional-failure indicator is set, execute the COMMIT instruction without committing any transactional results to the architectural state of the processor.

8. The apparatus of claim 5, wherein executing program code in the transactional-scout mode involves executing instructions to generate prefetches for cache lines and to update processor state, but not committing transactional-scout mode results to an architectural state of the processor.

9. A computer system for executing instructions in a transactional-scout mode, comprising:
a processor, wherein the processor is configured to:
transactionally execute instructions from a protected section of program code;
responsive to encountering a transactional failure condition, enter the transactional-scout mode and speculatively execute subsequent instructions in the transactional-scout mode;
execute subsequent instructions in the transactional-scout mode until the transactional failure condition is resolved or until the transactional failure condition and one or more additional transactional failure conditions are resolved; and
responsive to the transactional failure condition being resolved, return to a normal-execution mode to execute instructions from a fail PC; and
a memory coupled to the processor, wherein the memory stores instructions and data for the processor,
wherein a COMMIT instruction indicates an end of the protected section of program code, and wherein when executing subsequent instructions in the transactional-scout mode until the transactional failure condition is resolved, the processor is configured to:
execute the instructions in the protected section including the COMMIT instruction in the transactional-scout mode, but prevent any transactional results from being committed to an architectural state of the processor in response to executing the COMMIT instruction; and
continue to execute instructions following the protected section in the transactional-scout mode until the transactional failure condition is resolved.

10. The computer system of claim 9, wherein before encountering an end of the protected section of program code and responsive to determining that the transactional failure condition has been resolved, the processor is configured to leave the transactional-scout mode and return to the normal-execution mode to execute instructions from the fail PC.

11. The computer system of claim 9, wherein when entering the transactional-scout mode the processor is configured to set a transactional-failure indicator, wherein when executing a COMMIT instruction while executing instructions in a transactional-execution mode or the transactional-scout mode, the processor is further configured to:
check a state of the transactional-failure indicator; and
when the transactional-failure indicator is set, execute the COMMIT instruction without committing any transactional results to the architectural state of the processor.

* * * * *